United States Patent
Uchida et al.

[11] Patent Number: 6,153,954
[45] Date of Patent: Nov. 28, 2000

[54] MOTOR EQUIPPED WITH A COIL TEMPERATURE SENSING ELEMENT

[75] Inventors: Hiroyuki Uchida; Isao Kariya, both of Yamanashi, Japan

[73] Assignee: Fanuc Ltd., Yamanashi, Japan

[21] Appl. No.: 09/077,037

[22] PCT Filed: Sep. 18, 1997

[86] PCT No.: PCT/JP97/03304

§ 371 Date: Jul. 22, 1998

§ 102(e) Date: Jul. 22, 1998

[87] PCT Pub. No.: WO98/12793

PCT Pub. Date: Mar. 26, 1998

[30] Foreign Application Priority Data

Sep. 18, 1996 [JP] Japan .................................. 8-266563

[51] Int. Cl.[7] .................................................. H02K 11/00
[52] U.S. Cl. ........................................ 310/68 C; 310/71
[58] Field of Search ................................ 310/68 C, 71;
318/471; 374/163, 208

[56] References Cited

U.S. PATENT DOCUMENTS

| | | | |
|---|---|---|---|
| 4,112,405 | 9/1978 | Joseph | 337/4 |
| 4,236,092 | 11/1980 | DiFlora | 310/68 C |
| 4,250,419 | 2/1981 | Zolman | 310/68 C |
| 4,337,114 | 6/1982 | Russell et al. | 216/106 |
| 4,340,886 | 7/1982 | Boldt et al. | 340/682 |
| 4,571,518 | 2/1986 | Kintz, Jr. et al. | 310/68 R |
| 4,674,344 | 6/1987 | Kazino et al. | 74/7 A |
| 4,734,602 | 3/1988 | Hauser et al. | 310/68 C |
| 4,858,481 | 8/1989 | Abraham | 74/89.15 |
| 4,890,025 | 12/1989 | Hadeler et al. | 310/68 C |
| 4,894,571 | 1/1990 | Hildebrandt et al. | 310/68 C |
| 4,914,329 | 4/1990 | Ottersbach | 310/68 C |
| 5,140,205 | 8/1992 | Baines | 310/68 C |
| 5,294,851 | 3/1994 | Tajima et al. | 310/68 C |

FOREIGN PATENT DOCUMENTS

| | | |
|---|---|---|
| 52-46401 | 4/1977 | Japan . |
| 61-205266 | 12/1986 | Japan . |
| 6-70510 | 3/1994 | Japan . |
| 7-312850 | 11/1995 | Japan . |

OTHER PUBLICATIONS

Microfilm of the specification of Japanese Application 048788 (Oct. 25, 1980), p. 4, line 18 to p. 5, line 1.
Microfilm of the specification of Japanese Application 094997 (Apr. 4, 1991), p. 5, line 17 to p. 6, line 12.
Microfilm to the specification of Japanese Application 088407 (Dec. 24, 1986), p. 5, lines 1 to 16.
Microfim of the specification of Japanese Application 128403 (Apr. 22, 1981), p. 5, lines 4 to 12.

*Primary Examiner*—Nestor Ramirez
*Assistant Examiner*—Joseph Waks
*Attorney, Agent, or Firm*—Staas & Halsey LLP

[57] ABSTRACT

A temperature sensing element mounted using a guide hole formed in the housing of a motor. The mounting of the temperature sensing element is carried out without additional processing to a coil mounted on a stator, enabling automated mounting of the temperature sensing element. Further, the mounting location of the temperature sensing element is fixed by the location of the guide hole, so that positioning of the temperature sensing element is made easier, and stable temperature sensing is made possible.

9 Claims, 4 Drawing Sheets

PRIOR ART

MOTOR EQUIPPED WITH A COIL TEMPERATURE SENSING ELEMENT

BACKGROUND OF THE INVENTION

1. Field of the Invention

The present invention relates to an electric motor, in which a temperature sensing element for sensing the temperature of the motor coil is provided on a stationary part of the motor, such as the housing of the motor body, for the protection of the coil.

2. Description of the Related Art

The coil of an electric motor generates heat due to core loss and ohmic loss. Motors equipped with a coil heat protection function sense the temperature of the coil part to prevent coil heat loss resulting from heat generation. To sense the temperature of this coil, ordinarily the temperature sensing element is either embedded into the coil between the windings, or affixed to the coil using string.

FIGS. 7, 8A and 8B are schematics illustrating conventional methods for mounting a coil temperature sensing element to a motor. To graphically represent the coil part, FIG. 7 provides a cut-away view of one part of the motor. FIGS. 8A and 8B only show that part of the motor to which the temperature sensing element is mounted. The motor illustrated in FIG. 7 incorporates a stator 12, around which a coil 13 is wound, and a rotor 10, which is supported and rotated by a rotor shaft 11 inside the stator 12. At one axial end of the stator 12 there is a front flange 15, and at the other end there is a rear housing 14. A temperature sensing element 1 for sensing the temperature of the coil 13 of the stator 12 is a sensor such as a thermistor, the output from which is derived via a lead wire 3.

Conventionally, to mount a temperature sensing element 1 to a coil 13, the temperature sensing element 1 was inserted into the inside of the motor through an opening in the center of the rear housing 14 (indicated by an arrow in FIG. 7) to be either embedded between the exposed windings (FIG. 8A), or attached to the coil 13 with string (FIG. 8B).

FIG. 8A illustrates the method, whereby the temperature sensing element is embedded between the windings of a coil. To embed a temperature sensing element between the windings of a coil, when mounting the coil 13 to the stator 12 and subjecting the end of the coil to wire processing, a space is opened in the coil by spreading apart the windings, and after embedding and securing the temperature sensing element 1 in that space, impregnating is performed.

FIG. 8B illustrates the method, whereby a temperature sensing element is attached to a coil using a string. Even when the temperature sensing element is attached using this string, when mounting the coil 13 to the stator 12 and subjecting the end of the coil to wire processing, a string 40 is looped around a portion of the coil 13, and after securing the temperature sensing element 1 to the coil 13 with the string 40, impregnating is performed.

With the conventional methods of mounting a temperature sensing element to a coil, in order to form the space for inserting the temperature sensing element, or the space through which a string is passed, it is necessary to unwind the coil, which has been inserted are formed on the stator. Since this mounting operation is extremely time-consuming, it has been difficult to automate the task of mounting a temperature sensing element. And, in this mounting operation, there is a danger such that the coil will be damaged when the temperature sensing element is forced between the windings during the mounting operation.

Further, mounting methods that call for forcing a temperature sensing element between windings, or securing it with string pose problems in that the mounting location of the temperature sensing element is not fixed, and that temperature sensing precision varies because the measurement point in the motor where the temperture is sensed varies according to motors or the mount is not stable, so that the mounting attitude changes.

SUMMARY OF THE INVENTION

An object of the present invention is to provide an electric motor that is equipped with a temperture sensing element, which senses the temperature of the coil of the motor, this electric motor having a motor body and temperature sensing element with structures that facilitate mounting the temperature sensing element to the body of that motor.

To achieve the above-stated object, in accordance with the present invention, when it comes to a motor equipped with a coil temperature sensing element, a through hole is formed in one part of the motor housing, a temperature sensing element is inserted into and held in place yb the above-mentioned through hole, and is maintained in a state wherein the tip of this temperature sensing element comes in contact with the motor coil.

More preferably, the coil temperature sensing element is inserted into the through hole of the housing and held in place by a holder formed from a film material or elastic member.

Even more preferably, a folding flap is formed on at least one portion of the periphery of the holder so that, when this holder is not inserted into the through hole of the housing, this folding flap extends outward, but, when the holder is inserted into the through hole of the housing, this folding flap is pressed inward by this through hole to become flush with the wall surface.

Even more preferably, a sleeve that is longer than the wall thickness of the housing is fitted into the through hole of the housing, and a portion of the sleeve is allowed to protrude from the inner surface of the housing toward the motor coil. A holder, which holds a temperture sensing element, is then inserted into and held in place by this sleeve.

And even more preferably, a high thermal conductivity resin is coated onto the location where the temperature sensing element and motor coil make contact. As described above, in accordance with the present invention, mounting a coil temperture sensing element to a motor body does not entail any additional processing to the coil itself, and enable the efficient, automated mounting of a temperature sensing element to a coil. And since the mounting location of the temperture sensing element is always constant, stable coil temperature sensing is possible.

DESCRIPTION OF THE PREFERRED EMBODIMENTS (First Embodiment)

Figure 1:
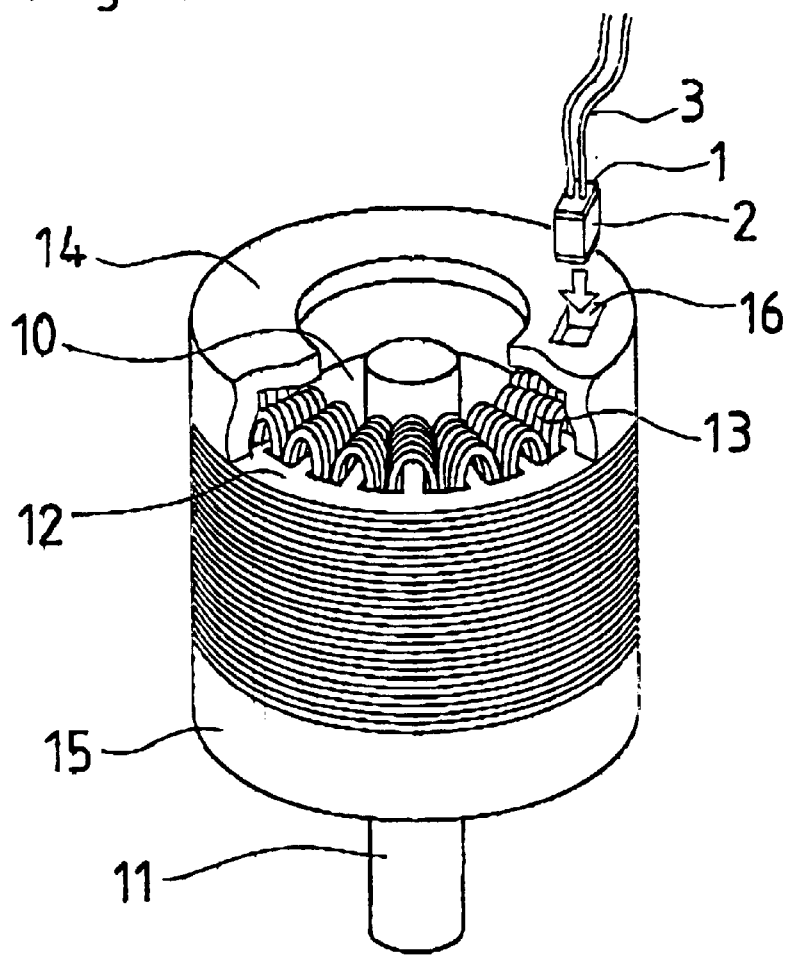
FIG. 1 is a perspective view of the principal parts of an electric motor in accordance with a first embodiment of the present invention, and shows the insertion of a holder-held coil temperature sensing element into a guide hole formed in a motor housing.
Figure 2:
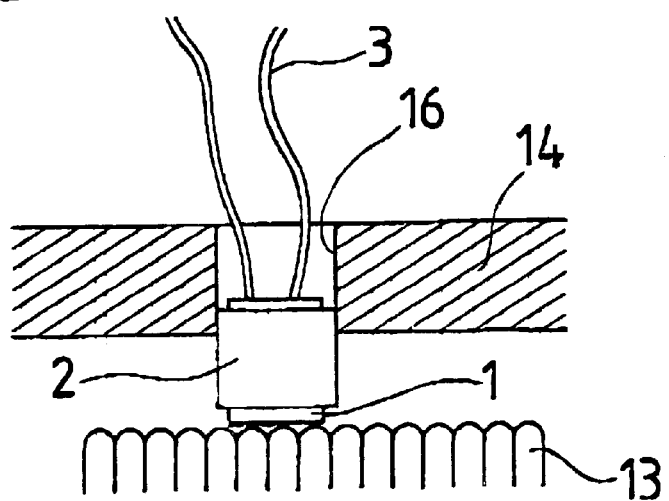
FIG. 2 is a cross-sectional view of the motor of FIG. 1 showing the state, wherein a holder-held coil temperature sensing element is inserted into and held in place by a guide hole.

A first embodiment of a motor equipped with a coil temperature sensing element is described with reference into FIG. 1 and FIG. 2. In the perspective view shown in FIG. 1, a portion of the motor is cut away to show the coil on the inside.

Figure 7:
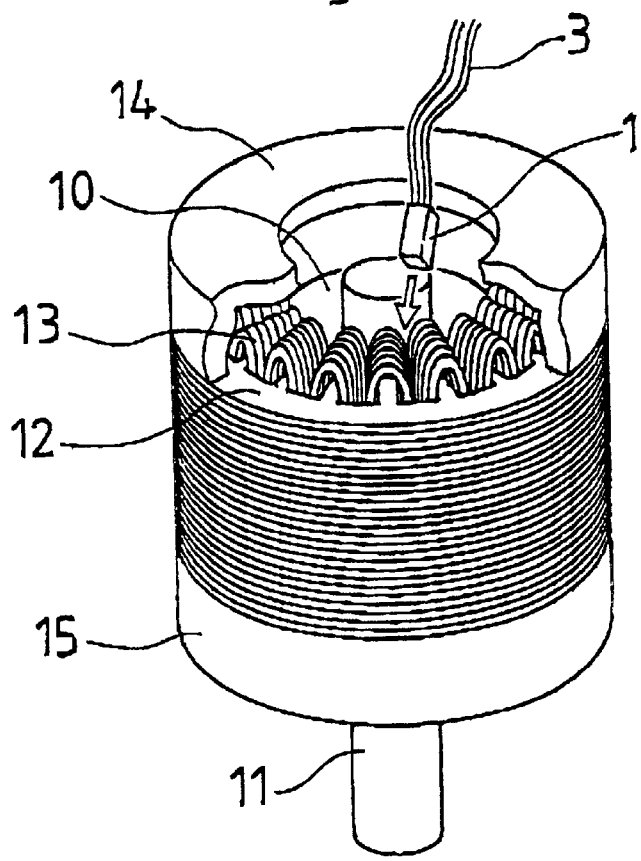
FIG. 7 is a perspective view illustrating a method of mounting a coil temperature sensing element on a motor using conventional technology.
Figure 8A:
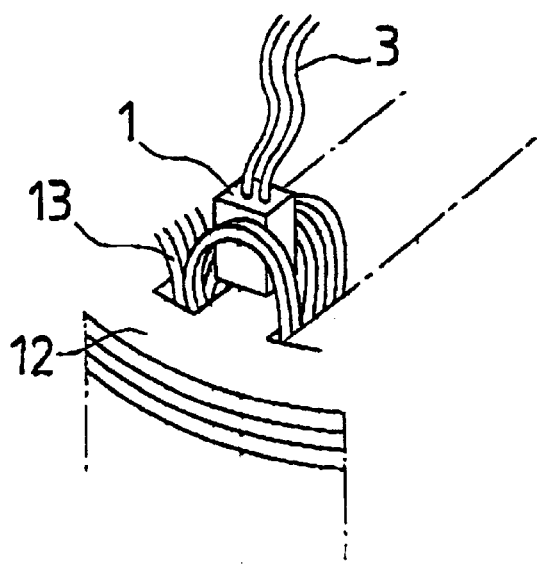
FIG. 8A and 8B are perspective views showing the states of coil temperature sensing elements mounted on motors using the conventional method illustrated in FIG. 7.
Figure 8B:
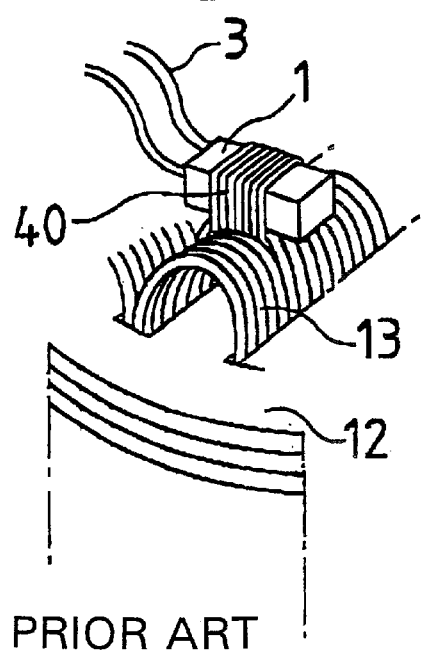

The motor itself is the same as the motor shown in FIG. 7 described above, and comprises a stator 12 around which a coil 13 is wound, and a rotor 10 which is supported and rotated by a rotor shaft 11 inside the stator 12. At one axial end of the stator 12 there is a front flange 15, and at the other end there is a rear housing 14. The temperature sensing element 1 is a device, such as a thermistor, for sensing the temperature of the coil 13, and the detected signal output from the temerptaure sensing element 1 is derived via a lead wire 3.

A through hole (guide hold 16) for receiving and holding the temperature sensing element 1 is formed in the rear housing 14 of the motor. This guide hold 16 is made when the housing is formed from an aluminum die casting, for example. When this guide holder 16 is designed to directly receive a temperature sensing element 1, the guide hold 16 must undergo separate high-precision machining so that the temperature sensing element 1 inserted therein maintains a stable state without forming any gap. However, if the guide hold 16 is formed slightly larger than the temperature sensing element 1 beforehand, and, for its part, the temperature sensing element 1 is held around its periphery by a holder 2, and then the temperature sensing element 1 is inserted into the guide hole 16 mounted in the holder 2 as-is, the temperature sensing element 1 can be stabilized inside the guide hole 16 by adjusting the thickness of the holder 2. Therefore, if this kind of mounting means is used, there is no longer any need for the high-precision machining of the guide hole 16.

The holder 2 has the role of holding the temperature sensing element 1 in the guide hole 16, and it also serves as heat insulation so that thermal conduction is not received from parts other than the part where the temperature sensing element 1 makes contact with the coil 13. Therefore, the holder 2 can be formed from materials with allow coefficient of thermal conductivity, such as polyethylene therephthalate (PET), and can be formed film or an injection-molded product.

Further, the location of the guide hole 16 is not limited to the rear housing 14, and may be formed at any other location in the housing if so desired. FIG. 2 illustrates a state wherein a temperature sensing element 1 held in a holder 2 is inserted into a guide hole 16 provided in a housing 14. The tip of the temperature sensing element 1 is not covered by the holder 2, but rather is exposed and is in contact with a portion of the motor coil 13. The temperature sensing element 1 measures the temperature of the coil 13 from the portion of the coil 13 with which it is in contact, and sends out a detected signal via a lead wire 3.

The fastening of the temperature sensing element 1 to the housing 14 is performed by the frictional resistance generated by the contact of the inner surface of the guide hole 16 with the periphery of the holder 2. And the heat from the rear housing 14 is thermally insulated by the low thermal conductivity of the holder 2.

As described above, in accordance with this embodiment, by inserting a temperature sensing element 1 into a guide hole 16 formed in the housing of a motor, a motor equipped with a coil temperature sensing element is formed, and the relative position of the temperature sensing element 1 to the stator coil 13 is invariably determined by the location of the guide hole 16. And, since no additional processing of any sort is done to the coil 13 when mounting the temperature sensing element 1, the coil will not undergo any chances of being damage, and thus the installation work can be completed easily. As a result, a temperature sensing element installation work to a motor can be mechanized, and the operating environment of the temperature sensing element can be maintained consistent for each motor.

An example of a variation of the holder for the motor in accordance with this embodiment is explained below with reference to FIGS. 3 and 4.

Figure 3:
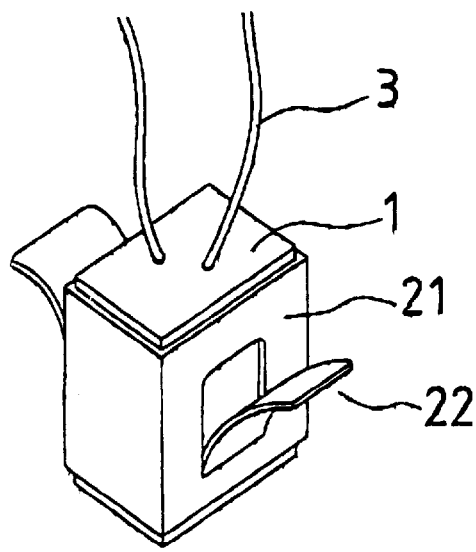
FIG. 3 is a perspective view showing a variation of the holder illustrated in FIG. 1.

Two upside-down U-shaped cuts are made into opposite walls of the holder 21, as shown in FIG. 3, and these cut parts are pulled outward to form a pair of folding flaps 22. These folding flaps 22 respectively extend upward (in the direction opposite to guide hole insertion) from a location at the lower portion (forward end in the direction of guide hole insertion) of each of two walls of the holder 22, and their tips are free ends. The distance between the folding flap 22 and the wall of the holder 21 increases towards the top of the folding flap 22.

When this holder 21 is inserted into the guide hole 16 formed in the housing 14, the folding flaps 22 move toward the walls of the holder as the holder is being guided into the guide hole 16 until the flaps 22 finally become flush with the walls of the holder. Then, as the holder 21 is inserted further into the guide hole 16 until the free ends of the flaps 22 are not longer in contact with the inner surface of the guide hole 16, the flaps 22, by virtue of their elasticity, once again open outward, and, as shown in FIG. 4, come in contact with the inner surface of the housing 14. In this state, even when a force is given in a direction so as to remove the holder 21 from the guide hold 16, such a force acts to cause the flaps 22 to open outward furhter, as shown in FIG. 4, so that the flaps 22 thus prevent the holder 21 from slipping out of the guide hole 16.

In the example illustrated in FIG. 3, folding flaps 22 are formed by furnishing cutouts on two opposite walls of the holder 21, but folding flaps 22 may also be provided on all the four walls (4 sides) of a holder 21, or only a single folding flap may be provided on only location. The formation of folding flaps 22 can also employ means other than cutouts (such as integrating them with the holder 21 by injection molding, for example).

Next, a configuration, which enhances thermal conductivity between a temperature sensing element and a coil, is explained with reference to FIG. 4.

The holder 21 is designed so that the temperature sensing element 1 does not sense temperatures other than that of the motor coil 13. And, a resin member 30, having a high thermal conductivity and a good adhesiveness, is applied to the surface, where the tempertaure sensing element 1 makes contact with the coil 13. By doing so, the thermal resistance of the area, where the temperature sensing element 1 makes contact with the coil 13, can be reduced, thus improved temperature sensing accuracy by the temperature sensing element 1 can be expected.

The resin member 30 is flexible immediately following application, and when the temperature sensing element 1 and coil 13 are maintained in a state of mutual contact, the resin member 30 hardens, bonding to the contact surfaces and the surrounding area. After hardening, the resin member 30 maintains the contact between the temerptaure sensing element 1 and coil 13 by virtue of its strong adhesive properties, and its high thermal conductivity makes possible high-accuracy temperature sensing. A silicon resin, for example, can be sued as a resin ember 30.

(Second Embodiment)

A second embodiment of a motor equipped with a coil temperature sensing element is explained with reference to FIG. 5. This embodiment is adapted to a situation wherein the distance between the housing 14, which is equipped with a guide hole for temperature sensing element insertion, and the coil 13 is relatively large, and thus the tip of the temperature sensing element held by holder cannot reach the motor coil 13 by simply inserting the holder into the guide hole.

Figure 5:
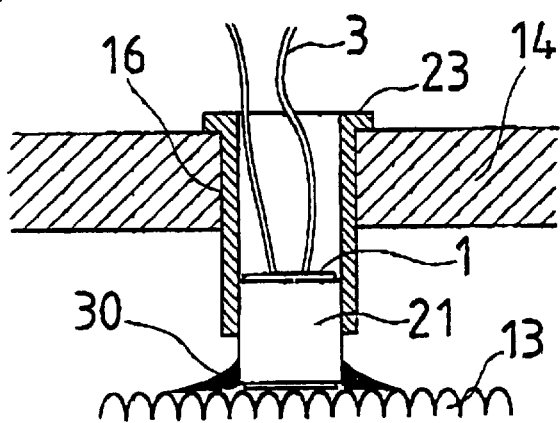
FIG. 5 is an cross-sectional view illustrating the principal part of a motor in accordance with a second embodiment of the present invention, showing a sleeve fitted into a guide hold formed in the housing of a motor, and a holder-held coil temperature sensing element being inserted into that sleeve.

Thus, as shown in FIG. 5, in this embodiment, a sleeve 23, which is longer than the wall thickness of the housing 14, is inserted into the guide hole 16 of the housing 14 and fastened so that a portion of the sleeve 23 protrudes inward from the inner surface of the housing 14 (toward the coil 13). By doing so, a holder 21, which holds a temperature sensing element 1, is inserted into this sleeve 23, and is held in place by the lower end portion of the sleeve 23. Since this enables the holder 21 held in place by the sleeve 23 to be positioned below the level of the housing 14 (in the direction of the coil 13), the tip of the temperature sensing element 1 held by the holder 21 can make contact with the motor coil 13. A suitable length for sleeve 23 can be selected depending on the distance between the housing 14, provided with the guide hole and the coil 13.

Figure 4:
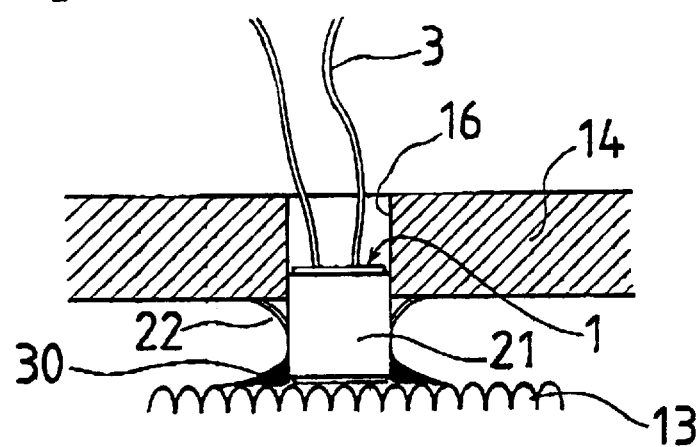
FIG. 4 is a cross-sectional view showing the state, wherein the coil temperature sensing element held by the holder illustrated in FIG. 3 has been mounted on the housing of the motor.

Similar to the embodiment illustrated in FIG. 4, in this embodiment as well, as resin member 30 is applied between the temperature sensing element 1 and the coil 13 to maintain a good contact and a resulting good thermal conductivity between the temperature sensing element 1 and the coil 13.

(Third Embodiment)

Figure 6:
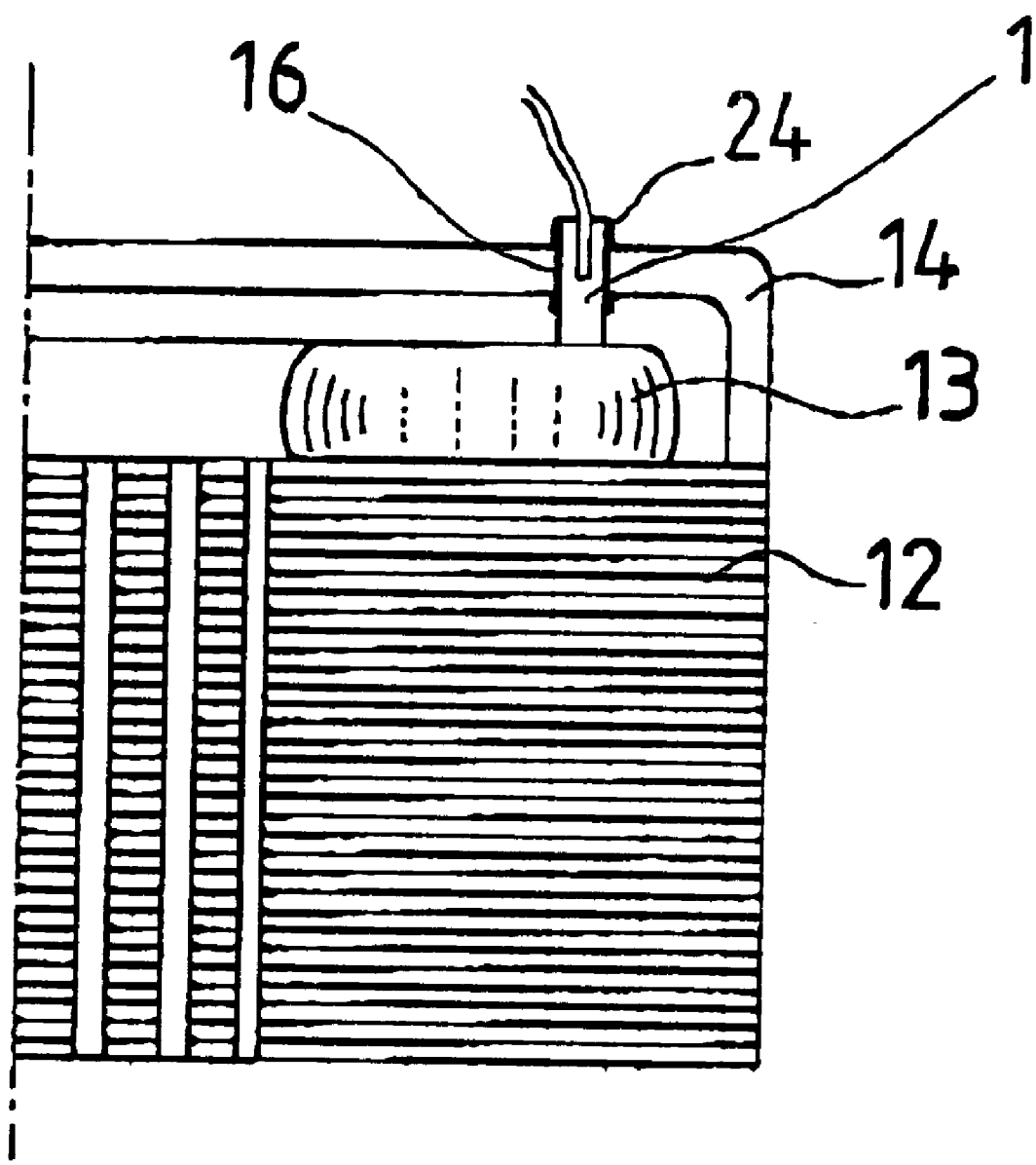
FIG. 6 is an cross-sectional view illustrating the principal part of a motor in accordance with a third embodiment of the present invention, showing a coil temperature sensing element, which is held in a holder made from an elastic material, inserting into and held in place by a guide hold formed in the housing of a motor.

A third embodiment of a motor equipped with a coil temperature sensing element is explained with reference to FIG. 6. In this embodiment, a holder is formed from rubber or some other elastic material, and the elasticity of the material is utilized to hold the temperature sensing element in place.

The temperature sensing element 1 is held by the rubber holder 24. When the holder 24 holding this temperature sensing element 1 is inserted into a guide hole 16 provided in the housing 14, this holder 24 is compressed by the guide hold 16. The holder 24 (and temperature sensing element 1) inserted into the guide hole 16 is maintained in a predetermined location within the guide hole 16 by the elastic restoring force of the holder 24, whereby the contact between the temperature sensing element 1 and the motor coil 13 is maintained. An elastic member other than rubber may be used as the holder 24 material.

What is claimed is:

1. A motor device, comprising:

a motor coil;

a motor housing to house the motor coil, the motor housing having a through hole formed therein; and a coil temperature sensing element inserted into and held by said through hole, wherein a tip of said coil temperature sensing element is kept in contact with the motor coil; and wherein a high thermal conductivity resin is applied onto an area where said coil temperature sensing element contacts the motor coil.

2. A motor including a coil temperature sensing element, comprising:

a motor coil;

a motor housing to house the motor coil, the motor housing having a through hole formed therein; and a holder comprising allow thermal conductivity material surrounding an outer periphery of the coil temperture sensing element to hole the coil temperature sensing element, wherein the holder is inserted into and held by the through hole formed in said housing, such that a tip of said coil temperature sensing element is kept in contact with the motor coil, and wherein a high thermal conductivity resin is applied onto an area where said coil temperature sensing element contacts the motor coil.

3. A motor including a coil temperature sensing element as recited in claim 2, wherein said holder is formed from a film material.

4. A motor including a coil temperature sensing element as recited in claim 2, wherein said holder is formed from an elastic material.

5. A motor including a coil temperature sensing element as recited in claim 4, wherein the elastic material is rubber.

6. A motor including a coil temperature sensing element as recited in claim 2, wherein said holder including a folding flap formed on at least a portion of an outer periphery of said holder, said folding flap extends outward when said holder is not inserted into the thorough hole of the motor housing, and said folding flap is pressed inward when said holder is inserted into the through hole of the motor housing.

7. A motor including a coil temperature sensing element as recited in claim 6, wherein said folding flap is formed by cutting an upside-down U-shape into a periphery of the holder.

8. A motor including a coil temperature sensing element, comprising:

a motor coil;

a motor housing to house the motor coil, the motor housing including a through hole formed therein:

a sleeve having a length which is greater than a wall thickness of said motor housing fitted into said through hole, wherein a portion of said sleeve protrudes from an inner surface of the motor housing toward the motor coil; and a holder comprising a low thermal conductivity material to hole a periphery of the coil temepratur sensing element, wherein the holder is inserted into and held by said sleeve, and keeps a tip of said coil temperature sensing element in contact with the motor coil.

9. A motor including a coil temperature sensing element as recited in claim 8, wherein a high thermal conductivity resin is applied onto an area where said coil temperature sensing element contacts the motor coil.

* * * * *

UNITED STATES PATENT AND TRADEMARK OFFICE
CERTIFICATE OF CORRECTION

PATENT NO.   : 6,153,954
DATED        : November 28, 2000
INVENTOR(S)  : Uchida et al.

It is certified that error appears in the above-identified patent and that said Letters Patent is hereby corrected as shown below:

Column 3,
Line 59, change "allow" to -- a low --.

Column 4,
Line 36, change "top" to -- tip --.

Column 5,
Line 14, change "ember" to -- member --.

Column 6,
Line 15, change "allow" to -- a low --;
Line 17, change "hole" to -- hold --; and
Line 37, change "thorough" to -- through --.

Signed and Sealed this

Second Day of October, 2001

Attest:

*Nicholas P. Godici*

NICHOLAS P. GODICI
*Attesting Officer*       *Acting Director of the United States Patent and Trademark Office*